United States Patent
Berman et al.

(10) Patent No.: US 7,390,094 B2
(45) Date of Patent: Jun. 24, 2008

(54) METHOD AND APPARATUS TO ACHIEVE A NEUTRAL DARK STATE IN IMAGE PROJECTION SYSTEMS

(75) Inventors: Arthur Berman, San Jose, CA (US); Ying-Moh Liu, Saratoga, CA (US); Samson Yang, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 145 days.

(21) Appl. No.: 11/227,865

(22) Filed: Sep. 15, 2005

(65) Prior Publication Data

US 2007/0058139 A1    Mar. 15, 2007

(51) Int. Cl.
G03B 21/14 (2006.01)
G03B 21/26 (2006.01)
G03B 21/28 (2006.01)
G02B 27/14 (2006.01)
G02B 27/12 (2006.01)
G02B 5/22 (2006.01)
G02F 1/1335 (2006.01)
F21V 9/00 (2006.01)
H04N 5/74 (2006.01)

(52) U.S. Cl. .............................. 353/84; 353/20; 353/33; 353/34; 353/37; 353/81; 353/82; 359/634; 359/638; 359/640; 359/885; 349/9; 362/293; 348/750; 348/757; 348/758

(58) Field of Classification Search ................... 353/84, 353/20, 30, 31, 33, 34, 37, 88, 89, 97–99, 353/81, 82; 359/502, 629, 634, 638–640, 359/722, 885, 891; 349/5, 7, 8, 106; 362/2, 362/293; 348/224.1, 739, 744, 750, 757, 348/759; 345/32
See application file for complete search history.

(56) References Cited

U.S. PATENT DOCUMENTS

| | | | |
|---|---|---|---|
| 2002/0001135 A1* | 1/2002 | Berman et al. | 359/640 |
| 2003/0117546 A1 | 6/2003 | Conner et al. | |
| 2003/0151833 A1* | 8/2003 | Berman et al. | 359/831 |
| 2005/0127375 A1 | 6/2005 | Erchak et al. | |

* cited by examiner

Primary Examiner—Rochelle-Ann Blackman
(74) Attorney, Agent, or Firm—Martine Penilla & Gencarella, LLP

(57) ABSTRACT

An absorptive layer is added to an image display system. The absorptive layer is selected to compensate for tint in a black state of a displayed image. In a Liquid Crystal On Silicon (LCOS) based light engine, blue wavelengths may cause a predominate tint in black portions of an image (or an entirely black image is tinted blue), and the absorptive layer is calculated to absorb an amount of blue equivalent to the tint. The absorptive layer is, for example, an unbalanced magenta dichroic, or a yellow filter. The yellow filter may be placed at any point in the light chain, including input/output of a kernel, input/output of a projection lens, or portions of a light engine or display screen. An unbalanced magenta may be constructed by adding a yellow filter to an existing magenta dichroic in the kernel design.

28 Claims, 8 Drawing Sheets

METHOD AND APPARATUS TO ACHIEVE A NEUTRAL DARK STATE IN IMAGE PROJECTION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention related to filters and placement of filters in a light engine. The present invention relates to the provision of a neutral dark state in an imaging device. The present invention is more particularly related to the production of a neutral dark state in a Liquid Crystal on Silicon (LCOS) based video projector.

2. Discussion of Background

The components of an LCOS based video projector 100 are explained by example of a light engine with reference to FIG. 1. As shown, white light 110 is generated by a light source 105. The light is collected, homogenized, polarized, and formed into the proper shape and otherwise processed by optics (not all shown for clarity). The light then enters a prism assembly 150 where it is broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam modulates the green content of a full color video image. Similarly, the red and blue contents of the full color image are modulated by corresponding "red" and "blue" microdisplays. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

The black state of the video projector 100 is produced, for example, when the microdisplays are not energized. That is, light rays reflected from each of the microdisplays are not intended to be modulated or form part of the projected, making a black screen. Dark, but not 100% black, scenes in pictures or videos displayed on the screen 170 will likely have varying amounts or portions of a scene that are intended to be black.

SUMMARY OF THE INVENTION

The present inventors have realized the need to improve neutrality of the dark state in image systems, and particularly in Liquid Crystal On Silicon (LCOS) projectors. In one embodiment, the present invention is a prism assembly comprising, a set of optical components configured to separate light into a set of individual light beams directed to modulating faces of the prism assembly, and an absorptive element configured to remove tint in a black state of an image modulated by the prism assembly. The absorptive element is, for example, an unbalanced magenta dichroic, a yellow filter, or other compensating mechanism.

In another embodiment, the present invention is an unbalanced magenta dichroic, comprising, a dichroic element having essentially zero transmission in green light wavelengths, having approximately full transmission of red light wavelengths, and having a percentage less than full transmission in blue light wavelengths, wherein the percentage less than full transmission of blue wavelengths is equivalent to an amount of blue tint in a dark state of an image projection system. The disproportionate amounts of red and blue transmission causing the dichroic to be unbalanced are calculated to compensate for tint in the black state of the dark image.

In yet another embodiment, the present invention is a video projection system, comprising, a kernel configured to modulate an input light, a light engine configured to produce the input light, a lens configured to project the modulated light, and a filter, wherein the filter is configured to compensate for a dark state tint that would otherwise be present in the projected modulated light. In one alternative, the filter is a filter that is part of a basic design of the video projection system, but modified to compensate for the dark state tint, which may be, for example, a yellow filter disposed on a balanced magenta dichroic. The video projection system is, for example, a Liquid Crystal on Silicon (LCOS) High Definition (HD) Rear Projection Television (RPTV).

Portions of both the device and method may be conveniently implemented in programming on a general purpose computer, or microprocessor or control device. The present invention includes compensating for tint-compensation of non-dark state pictures by increasing amounts of modulation for non-dark state images or portions of images.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have realized that a desirable quality of a projected video image is that the dark state be a neutral black. That is, that the dark state be tinted neither red nor green nor blue. The dark state occurs in a projector, such as that described in FIG. 1, when, for example, all of the microdisplays do not modulate light and the screen displays an absence of color (black). The dark state is evident in an all black image, but the dark state may also occur in multiple locations in an otherwise non-dark state image.

However, the present inventors have also realized that the absence of color in a projected image can be hindered by certain colors or combinations of colors being reflected by the microdisplays even when the modulation is off or the microdisplays are not energized, resulting in a tint (e.g., blue tint) on the screen when displaying dark or black images or images having black or dark state portions.

Figure 2:
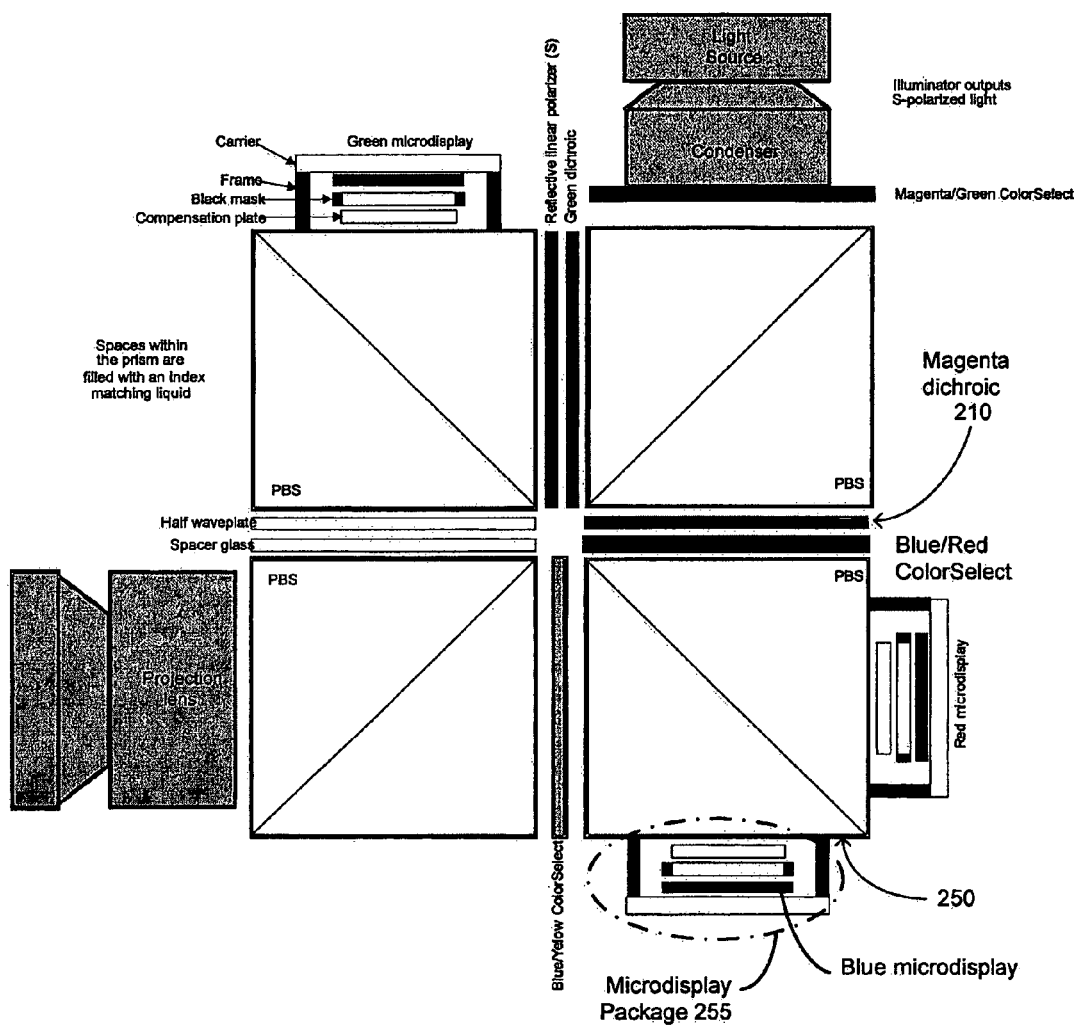
FIG. 2 is a drawing of a specific example of an lms-AT kernel 200.

Referring again to the drawings, wherein like reference numerals designate identical or corresponding parts, and more particularly to FIG. 2 thereof, there is illustrated a specific example of a kernel 200 in which the present invention may be applied. The kernel 200 is a version of an lms-AT kernel produced by Lightmaster Systems Inc. (LMS). Optical components internal to the kernel are indicated in the figure. Although the lms-AT kernel is utilized as an example, it should be understood that kernels of other designs are readily adaptable to the present invention, and the use of the lms-AT kernel should not in any way limit application of the present invention.

More generally, the lms-AT kernel is a quad style kernel. The quad style kernel comprises a set of beam splitters, one beam splitter in each quadrant of the kernel. The lms-AT kernel utilizes a set of reflective Liquid Crystal on Silicon (LCOS) microdisplays. Each microdisplay is mounted on a processing, or modulating, face of the kernel (e.g., "red", "blue", and "green" microdisplays) each mounted on corresponding red, blue, and green processing faces of the kernel. Other kernel designs that are also applicable include more or less modulating faces and a corresponding number of more or less microdisplays for additional, less, and/or different colors to be modulated.

Variances in the capability of the microdisplays to modulate the different color lights contributes to the dark state of an image projected from the kernel having a tint. For example, the microdisplays are less efficient at fully "turning off" the blue beam (or light modulated by the "blue" microdisplay).

Current designs utilized by the inventors include, for example, "cube" beamsplitters that are constructed from 2 right angle triangular prisms mated at diagonals of the prisms. The triangular prisms are, for example, of unequal dimensions and positioned along the diagonals at beamsplitter pathlength matched positions (e.g., the physical pathlengths of beams split by the beamsplitter travel the same distance within the beamsplitter). The beamsplitters are placed in prism assembly pathlength matched positions in the kernel (e.g. the pathlengths of each color light beam within the kernel are the same). The prisms are glass, and liquid coupling is utilized between adjacent faces of the beamsplitters.

The glass components and liquid coupling may contribute to the overall absorption of certain wavelengths of light and either promote or hinder the provision of a balanced dark state in a projected image. The optical element disposed in the light path(s) of the present invention compensate or provide further absorption in wavelengths needed to provide the balanced dark state. That imbalance mainly being attributed to the varying modulation efficiencies of the microdisplays at the longer wavelengths of blue light, but may also be attributed to and/or contributed by other specific components of a kernel, prism assembly, projection system, and/or light engine design.

The kernel (e.g., the lms-AT version illustrated in FIG. 1), is used in a projection system, such as a video projector. The video projector may be a front video projector, or a rear projector such as the type used in a Rear Projection Television (RPTV). The qualities of the optical components and microdisplays of the kernel and an associated light engine allow the projection of High Definition (HD) quality pictures (e.g., an HD RPTV).

Thus an HD RPTV (HDTV) or HD monitor having a kernel utilizing reflective LCOS microdisplays is preferably designed in connection with a light absorbing element that removes excess blue wavelengths in a dark state of the kernel. The light absorbing element has little or no effect on non-dark state pictures because the level of modulation is increased or decreased to compensate to provide a picture or video that is properly balanced depending on the requirements of the picture to be projected. Thus, blue wavelengths removed from a non-dark state picture or video are compensated for by increasing the amount of modulation of the same blue wavelengths resulting in a picture having a proper balance according to the requirements of the picture being projected.

Figure 1:
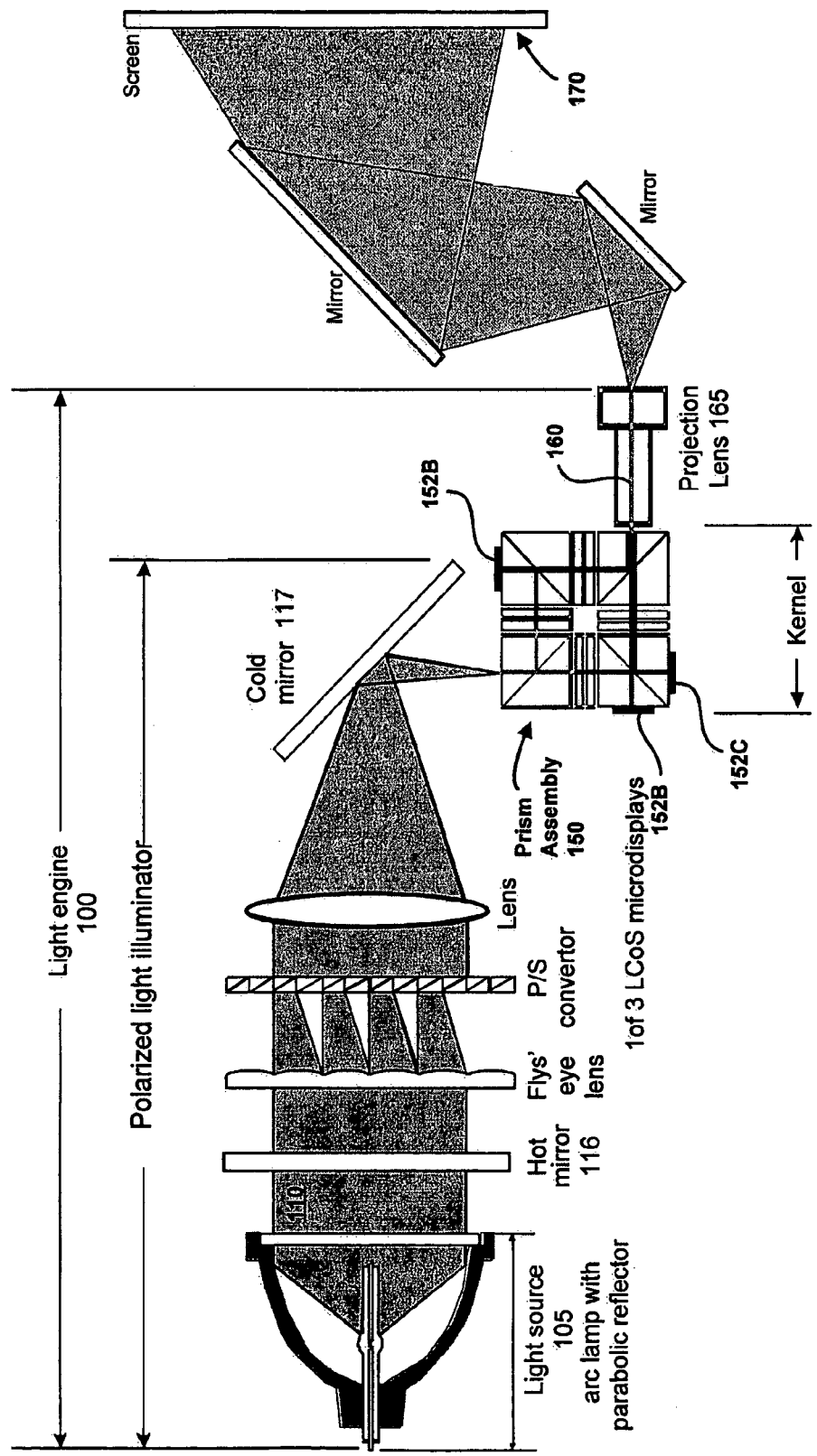
FIG. 1 is a drawing of LCOS based video projector.

The present invention is also described in conjunction with the use of a specific example of a light engine normally utilized with the lms-AT kernel, and it should be equally understood that many different light engine configurations are also applicable or usable in combination with the invention. The type of light engine normally utilized with the lms-AT kernel is shown in FIG. 1 as light engine [100].

Figure 3:
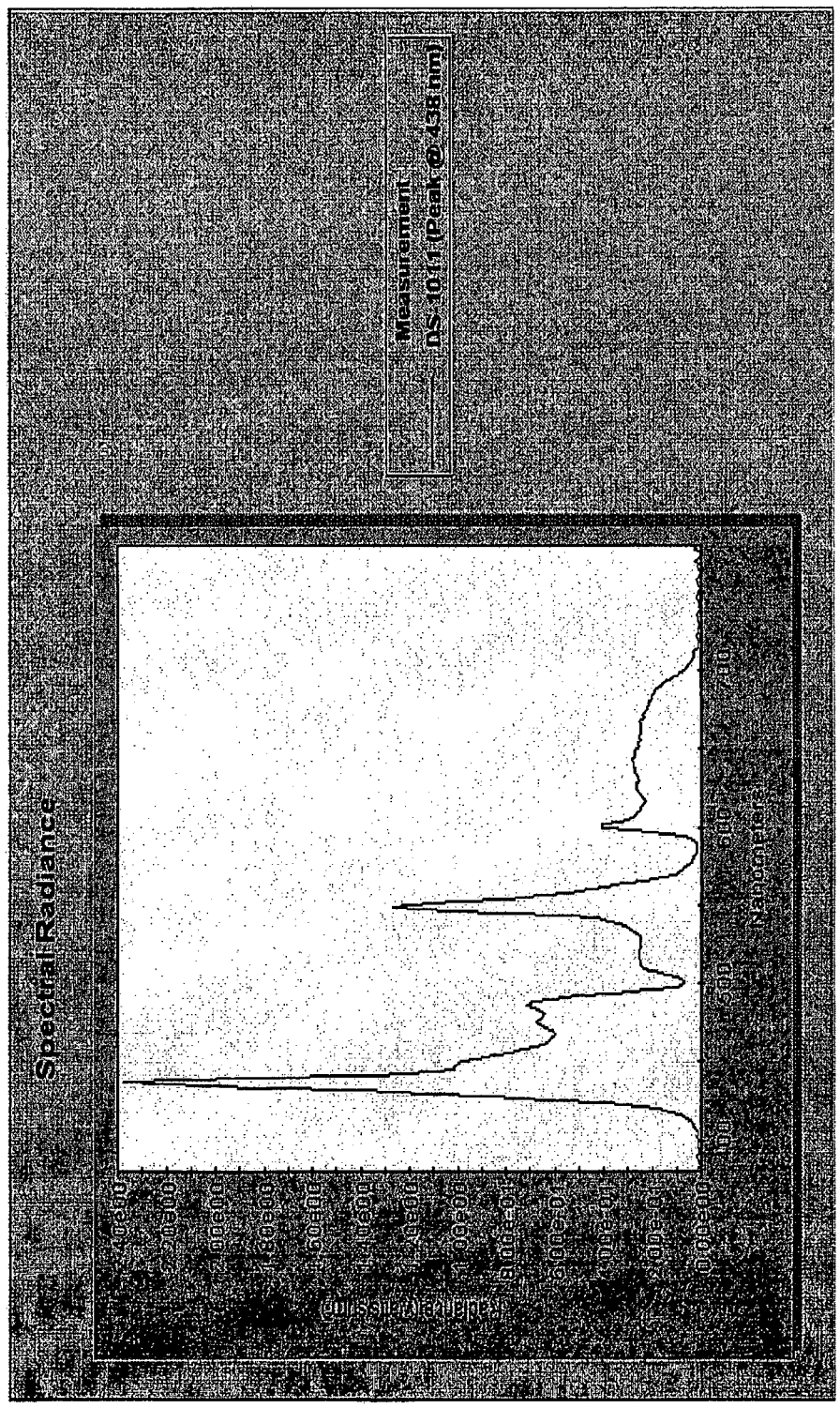
FIG. 3 is a graph of a spectrum of a dark state projected by the lms-AT kernel 200 when utilized in a specific but representative, commercially available version of the light engine 100.
Figure 4:
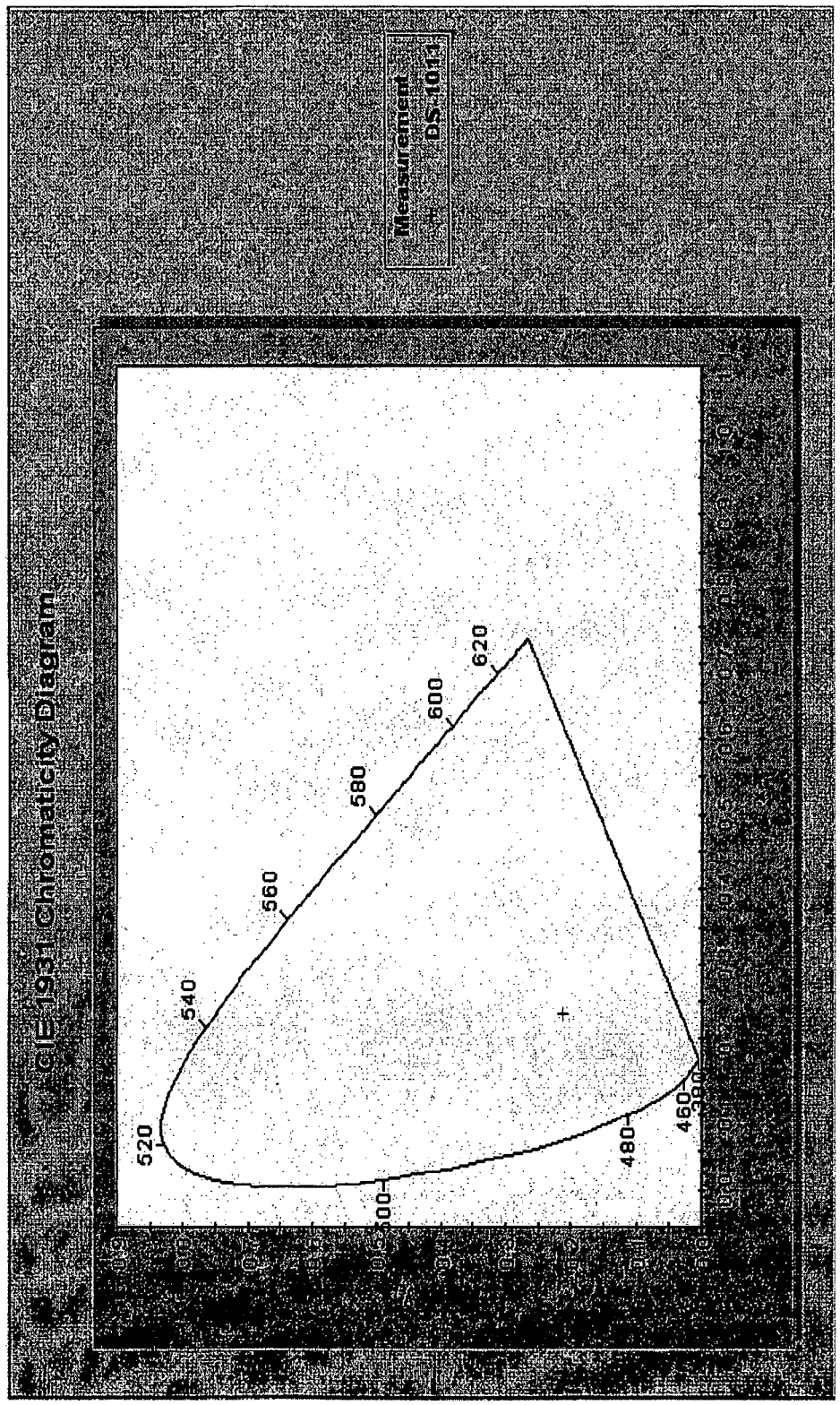
FIG. 4 is a dark state color projection based on the same data as FIG. 3 and is a 1931 C.I.E. chromaticity chart representation of the color point of the dark state.

FIG. 3 is a graph of a spectrum of the dark state projected by this version of the lms-AT when utilized in a specific but representative, commercially available version of this type light engine (the type of light engine similar to light engine 100). FIG. 4 is based on the same data as in FIG. 3 and is a 1931 C.I.E. chromaticity chart representation of the color point of the dark state. The information presented in FIGS. 3 and 4 indicates that the dark state is "bluish" rather than the more desirable neutral black.

The present invention can be implemented in or adjacent to the kernel and/or other portions of the light engine or display system to make more neutral the color of the dark state projected by the light engine. The basic concept underlying the invention is that an appropriate blue absorbing element be inserted into a light path of the kernel so as to render the dark state neutral.

Figure 5:
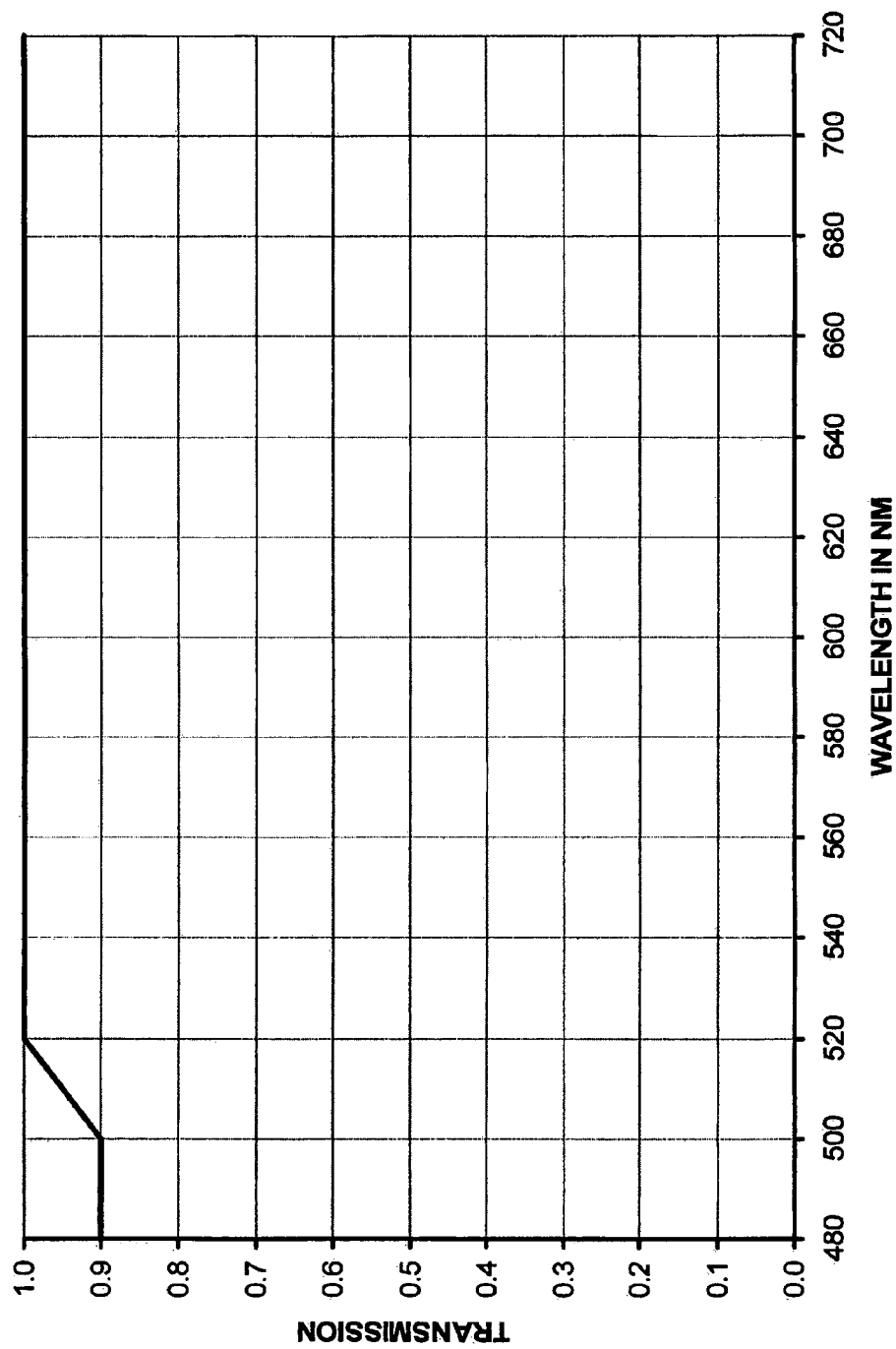
FIG. 5 is a general spectrum of a yellow filter according to an embodiment of the present invention.

In one embodiment, a yellow filter is inserted in optical series with the light path (light path, for example, extending from the light source 805 to display screen 870). The transmission spectrum of the type yellow filter required to perform this function is illustrated in FIG. 5. The percent transmission within the blue portion of the spectrum is determined by measurement of the projected image and is chosen to be appropriate to render the dark state neutral. The yellow filter can be included at any point in the optical path. Points for insertion include, for example, the input or output of the kernel or the input or output of the projection lens. The yellow absorption material could, in principle, be a layer added to the Fresnel lens or screen or even dispersed into the bulk of these materials.

Figure 6:
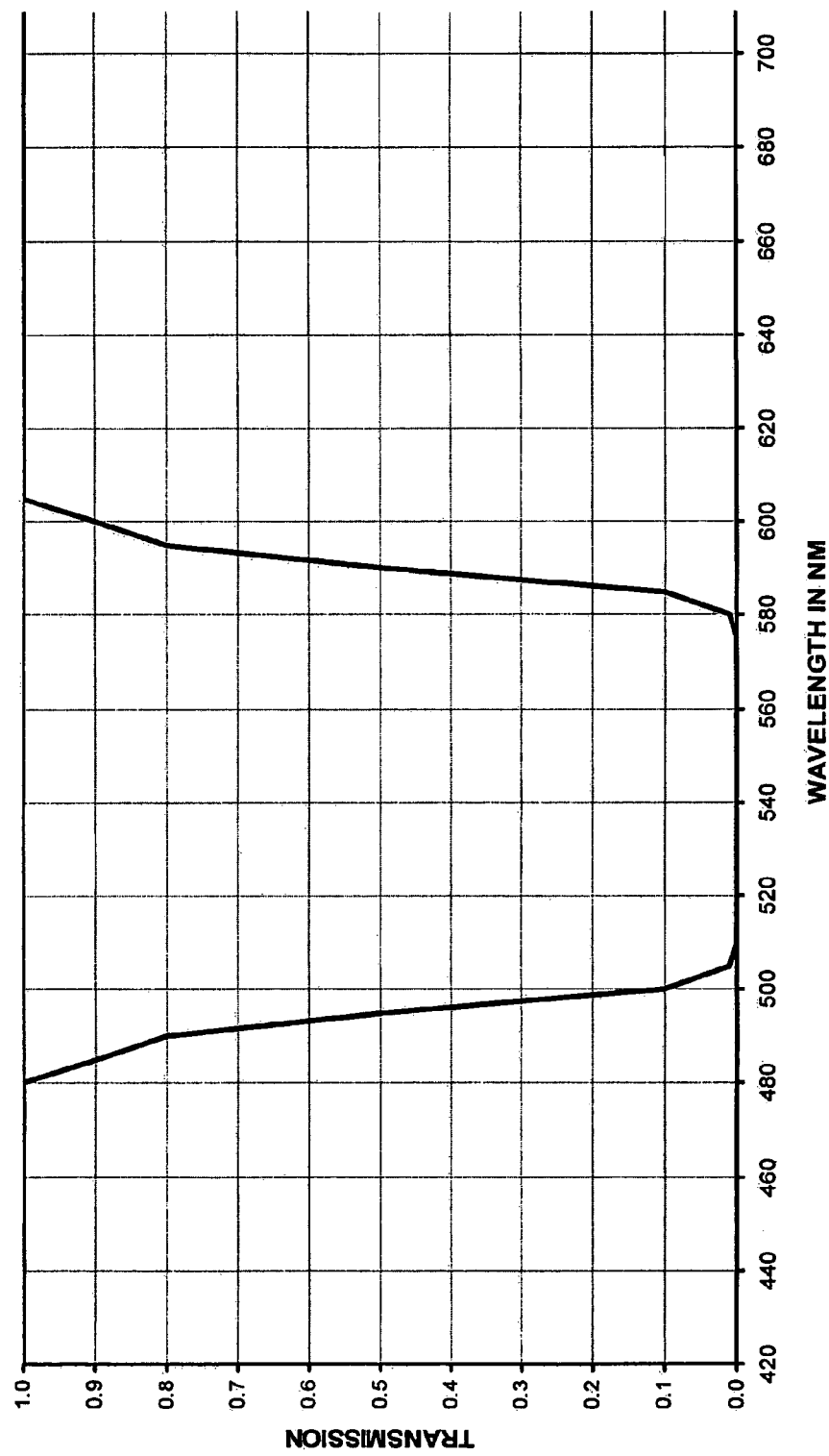
FIG. 6 is a general transmission spectra of a magenta dichroic.

In one embodiment, the present invention utilizes an unbalanced magenta dichroic. Note from FIG. 2 that one of the components in the lms-AT is a magenta dichroic filter. The spectrum of this filter is illustrated in FIG. 6. Clearly indicated is the fact that the transmission in the blue and red portions of the spectrum are equal.

Figure 7:
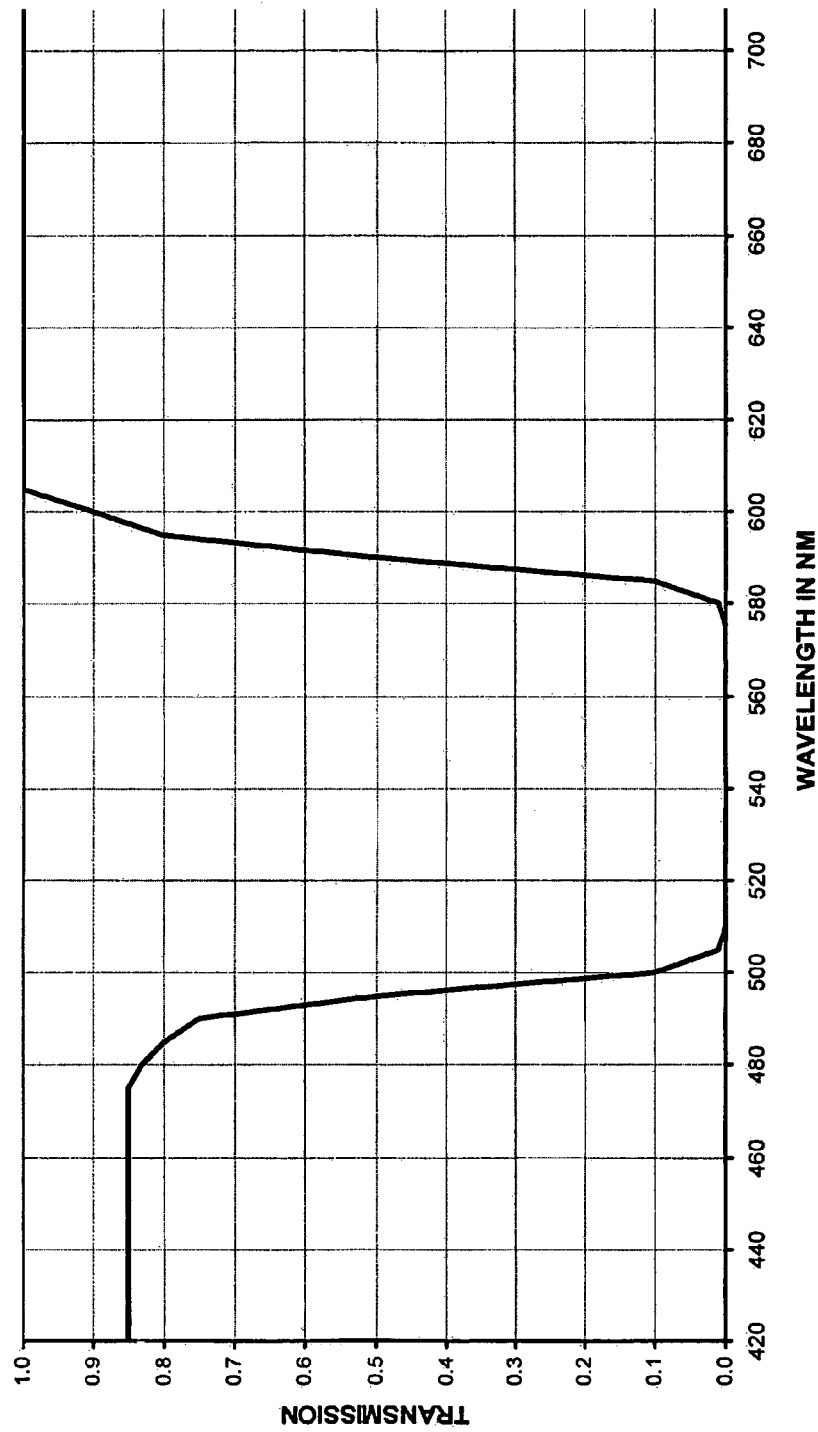
FIG. 7 is a representative transmission spectra of a magenta dichroic designed to suppress dark state coloration according to an embodiment of the present invention.

The basis of this embodiment of the invention is to reduce the transmission in the blue portion of the spectrum. In one embodiment, the transmission in the blue portion is reduced by the inclusion of a single dichroic thin film having the transmission characteristics illustrated in FIG. 7. The single dichroic thin film is for example substituted for the existing magenta dichroic 210 in the lms-AT kernel 200.

In another embodiment, the transmission in the blue portion is reduced by the addition of a second dichroic film. The second dichroic film is added, for example, to the opposite side of the substrate of the existing magenta dichroic 210. This thin film has, for example, a spectrum similar to that illustrated in FIG. 5 and, in conjunction with the existing magenta dichroic, produces a transmission spectrum similar to that presented in FIG. 7.

The present inventors note that it is possible for the image projected by the subject light engine to have a dark state that deviates from neutral blackness in colors other than blue. Variations of above discussed example techniques can also be used to correct red, green or compound color deviations. In each case, the absorbing elements are selected to have properties that directly compensate for the amount(s) of red, green, or other colors and/or compound deviations of colors in which the dark state is tinted.

Figure 8:
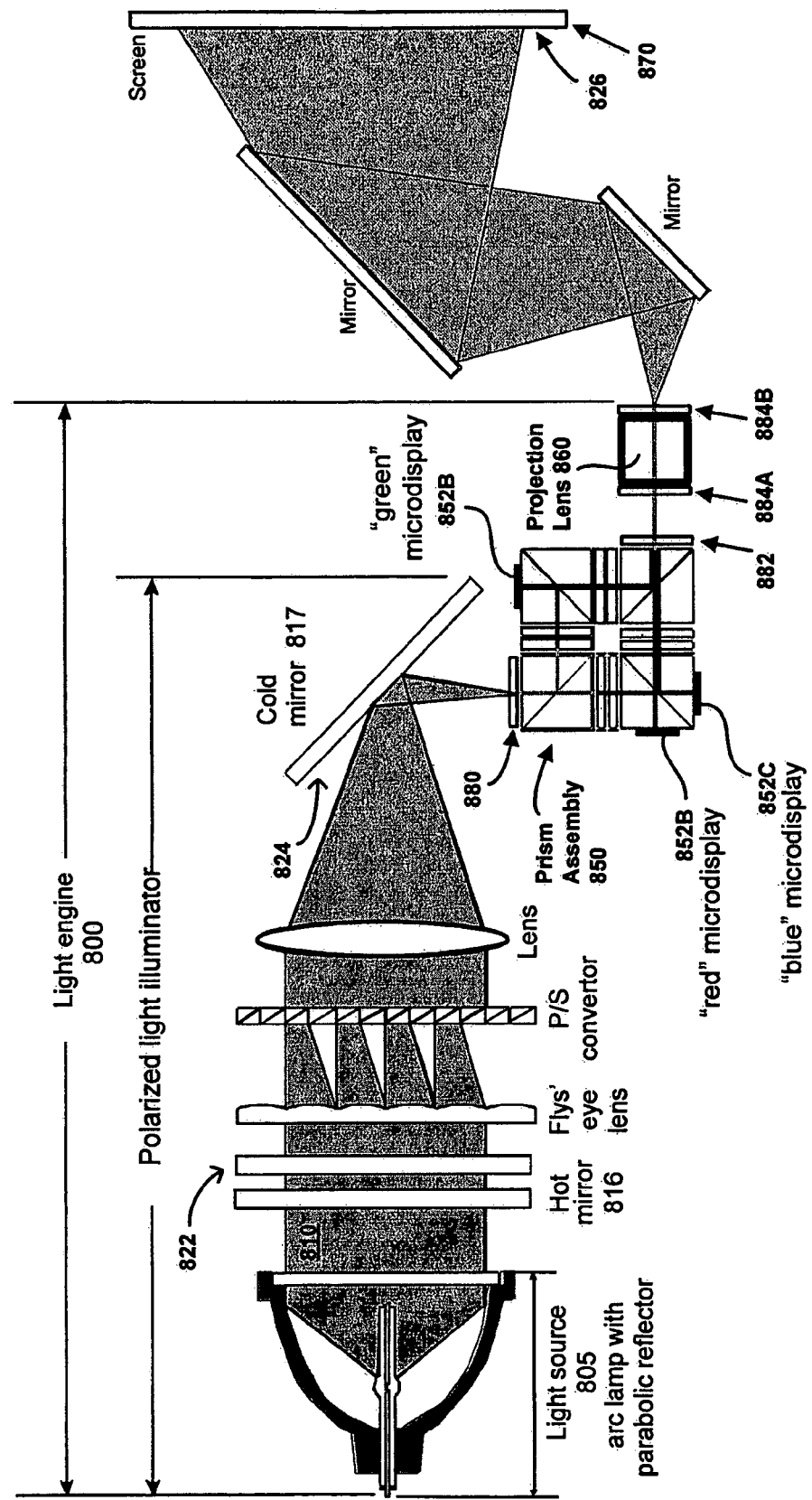
FIG. 8 is a drawing of a light engine and kernel illustrating locations for placing a yellow filter according to several embodiments of the present invention.

As shown in FIG. 8, the yellow absorptive material is positioned, for example, in any one or more of a number of locations, including, but not limited to:
absorptive material 880 at an input to the kernel;
absorptive material 882 at an exit to the kernel;
absorptive material 884A at the projection lens input;
absorptive material 884B at the projection lens output;
absorptive material 822 as an element in the light engine;
absorptive material 824 as a layer on any of the lenses, and/or other optical components of the light engine; and
absorptive material 826 as a layer and/or embedded in the display screen 870; and
absorptive materials on any of mirrors located in the projection system (projection lens and mirrors between kernel 800 and display screen 870).

The present invention includes the use of filters or absorptive materials inside the kernel. For example, the magenta dichroic discussed above. In one embodiment, the yellow absorptive material is in the form of a dye or other dissolvable material placed in index matching fluids used to couple optical components in the lights paths of the kernel (e.g. index matching fluid that couples adjacent faces of beamsplitters in the kernel). In yet another embodiment one or more absorptive elements are disposed on optical flats within the prism assembly and/or on modulating faces (e.g., modulating face 250) or other surfaces of the kernel and/or beam splitting components of the kernel. In one embodiment, the filter is disposed on an element of or is a separate element within a microdisplay package (e.g., within blue microdisplay package 255).

The present invention includes adjusting an amount of modulation of one or more microdisplays to compensate for non dark state images affected by any one or more filters or dichroics used to compensate for dark state tint. Including adjusting by increasing an amount of modulation of colors in non-dark state images displayed by the image projection system by an amount proportional to a reduction in the non-dark state images caused by the compensating filter(s). The adjusting is performed, for example, by electronics or other processing devices coupled to the microdisplays that are configured to make the appropriate modulation adjustments.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents, whether or not listed herein, which operate in a similar manner. Furthermore, the inventors recognize that newly developed technologies not now known may also be substituted for the described parts and still not depart from the scope of the present invention.

The present invention may suitably comprise, consist of, or consist essentially of, any of element (the various parts or features of the invention, and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the may be practiced otherwise than as specifically described herein.

What is claimed and desired to be secured by Letters Patent of the United States is:

1. A prism assembly comprising:
a set of optical components configured to separate light into a set of individual light beams directed to modulating faces of the prism assembly; and
an absorptive element configured to remove tint in a black state of an image modulated by the prism assembly, wherein the absorptive element is located at at least one of an input of the prism assembly or an output of the prism assembly or between two optical components of the prism assembly wherein the absorptive element includes an unbalanced dichroic.

2. The prism assembly according to claim 1, wherein the absorptive element has an amount of absorption that precisely compensates for the tint to produce a balanced black state of the image modulated by the prism assembly.

3. The prism assembly according to claim 1, wherein the absorptive element comprises a filter having properties that precisely compensates for the tint and produce a balanced black state of the image modulated by the prism assembly.

4. The prism assembly according to claim 3, wherein the absorptive element is a yellow filter.

5. The prism assembly according to claim 1, wherein the unbalanced dichroic has essentially zero transmission in green light wavelengths, having approximately full transmission of red light wavelengths, and having a percentage less than full transmission of blue wavelengths.

6. The prism assembly according to claim 1, wherein: the unbalanced dichroic has essentially zero transmission in green light wavelengths, having approximately full transmission of red light wavelengths, and having a percentage less than full transmission blue wavelengths; and the percentage less than full transmission of blue wavelengths is equivalent to an amount of blue tint in a dark state of an image projection system using the prism assembly.

7. An unbalanced magenta dichroic, comprising:
a dichroic element having essentially zero transmission in green light wavelengths, having approximately full transmission of red light wavelengths, and having a percentage less than full transmission in blue light wavelengths;
wherein the percentage less than full transmission of blue wavelengths is equivalent to an amount of blue tint in a dark state of an image projection system.

8. The unbalanced magenta dichroic according to claim 7, wherein the dichroic element comprises a waveplate comprising a balanced magenta transmission spectrum filter and a yellow filter.

9. The unbalanced magenta dichroic according to claim 8, wherein the yellow filter comprises a thin film disposed on the waveplate.

10. The unbalanced magenta dichroic according to claim 8, wherein the balanced magenta transmission spectrum filter comprises a first thin film disposed on the waveplate and the yellow filter comprises a second thin film disposed on the waveplate.

11. The unbalanced magenta dichroic according to claim 10, wherein the first thin film is disposed on a first side of the waveplate and the second thin film is disposed on a second side of the waveplate.

12. The unbalanced magenta dichroic according to claim 11, wherein the blue microdisplay is adjusted to modulate more light during non-dark scenes to compensate for the unbalanced magenta dichroic.

13. The unbalanced magenta dichroic according to claim 8 wherein the yellow filter comprises a transmission spectrum.

14. The unbalanced magenta dichroic according to claim 7, wherein the unbalanced magenta dichroic is installed in a red/blue light path of a prism assembly of the projection system.

15. The unbalanced magenta dichroic according to claim 7, wherein the unbalanced magenta dichroic is installed in a red/blue light path of a kernel; and the kernel comprises a quad style prism assembly having a set of at least 3 Liquid Crystal On Silicon (LCOS) light modulating reflective microdisplays, including a "blue" microdisplay, each microdisplay configured to module a single color light beam; and the blue tint comprises an inefficiency of the "blue" microdisplay to effectively "turn off" a blue light beam in a black image.

16. A video projection system, comprising:
a kernel configured to modulate an input light; a light engine configured to produce the input light;
a lens configured to project the modulated light; and
a filter; wherein the filter includes an unbalanced magenta dichroic and wherein the filter is configured to compensate for a dark state tint that would otherwise be present in the projected modulated light.

17. The video projection system according to claim 16, wherein the filter is a filter that is part of the basic design of the video projection system, but modified to compensate for the dark state tint.

18. The video projection system according to claim 16, wherein the unbalanced magenta dichroic has a transmission spectrum including substantially no transmission between about 500 nm and about 590 nm.

19. The video projector according to claim 16, wherein the filter includes a combination of a balanced magenta dichroic and a yellow filter.

20. The video projector according to claim 19, wherein the balanced magenta dichroic and the yellow filter are combined on a single waveplate.

21. The video projector according to claim 16, wherein the filter includes a yellow filter.

22. The video projector according to claim 16, wherein the filter is disposed on a surface of a component of the light engine.

23. The video projector according to claim 16, further comprising a screen configured to display the projected modulated light.

24. The video projector according to claim 16, wherein the video projection system comprises a Rear Projection Television (RPTV).

25. The video projection system according to claim 16, wherein the video projection system is a Liquid Crystal on Silicon (LCOS) High Definition (HD) Rear Projection Television (RPTV).

26. A method for removing tint in a black state of an image comprising:
adjusting an amount of modulation of a set of at least one colored light beam to compensate for dark-state compensating filter(s) placed in a light path of an image projection system, wherein the image projection system includes:
a set of optical components configured to separate light into a set of individual light beams directed to modulating faces of a prism assembly; and
an absorptive element configured to remove tint in a black state of an image modulated by the prism assembly, wherein the absorptive element is located at at least one of an input of the prism assembly or an output of the prism assembly or between two optical components of the prism assembly wherein the absorptive element includes an unbalanced dichroic.

27. The method according to claim 26, wherein the step of adjusting comprises increasing an amount of modulation of colors in non-dark state images displayed by the image projection system by an amount proportional to a reduction of the colors in the non-dark state images caused by the compensating filter(s).

28. The method according to claim 27, wherein increasing an amount of modulation comprises increasing an amount of modulation in at least one reflective Liquid Crystal On Silicon (LCOS) microdisplay in a kernel of a High Definition (HD) Rear Projection Television (RPTV).

* * * * *